United States Patent Office 3,450,817
Patented June 17, 1969

3,450,817
USE OF NICKEL MORPHOLINE DITHIO-
CARBAMATE AS A NEMATOCIDE
John Joseph Draney, Jr., deceased, late of Livingston,
N.J., by Jane Carolee Draney, executrix, Livingston,
N.J., assignor to The International Nickel Company,
Inc., New York, N.Y., a corporation of Delaware
No Drawing. Filed July 18, 1966, Ser. No. 566,080
Int. Cl. A01n 9/12
U.S. Cl. 424—245     2 Claims The present invention relates to an improved process for treating soil or growth media, and more particularly to an improved process for treating nematore-infested soil or growth media.

Agricultural experts motivated by an increasing awareness of the damages and losses resulting from nematode attack of plant life, including plants grown for good, for fiber and other purposes, have directed a great deal of their efforts to develop effective methods of controlling nematodes. Nematodes, worm-like organisms, invade plots of soil or growth media and inflict extensive damage to the root structure, bulbs, stems and foliage such that the yield of the plant is greatly diminished or the plant itself is completely destroyed. The dollar value of losses and damages directly attributed to nematode invasion in and through only the United States has been estimated to run into tens of millions of dollars annually. Nematode control is a highly complex problem involving considerations of phytotoxicity, human toxicity, plant seed germination, simplicity of the process control and, last but not least, cost.

Although many attempts were made to overcome the foregoing difficulties and other difficulties, none, as far as we are aware, was successful when carried into practice commercially on an agricultural scale. For example, it has been proposed to employ halogenated hydrocarbons as nematocides which are effective in destroying nematodes in the nemic stages. However, halogenated hydrocarbons are quite volatile which require special equipment for their application and which inherently give a short term control period after which nematodes in the egg stage having matured to the nemic stage or re-invasion of nematodes from untreated regions or from irrigation water are again free to inflict damage. Effective control of nematodes when employing halogenated hydrocarbons, therefore, requires re-application at about 90 day intervals which can only be resorted to when the crops being protected are high value crops. A need still exists for effective nematode control for low value crops which have both long and short growing periods.

It has now been discovered that particular nickel compounds display nematocidal characteristics and can be employed in treating soils without undue phytotoxic effects and without inhibiting germination.

It is an object of the present invention to provide an effective process for treating soil to control the nematodes.

Another object of the invention is to provide an improved treatment of nematode-infested soil to effectively control the nematodes without unduly endangering plant life.

The invention also contemplates providing a non-phytotoxic process of treating nematode-infested soil at a reasonable cost to eliminate the nematode problem.

Other objects and advantages will become apparent from the following description.

Generally speaking, the present invention comprises a process for the control of nematodes by introducing into soil a nematocidal amount of a nickel compound having the general formula [R:NCS$_2$]$_2$Ni wherein R is at least one heterocyclic substituent having not more than 2 atoms from the group consisting of sulfur, nitrogen, oxygen and combinations thereof. Examples of heterocyclic members which can be employed are members from the group consisting of morpholine, furan, thiophen, pyridine quinoline, pyrrolidine, pyrroline, pyrole, indole, dioxane, oxazoline, piperidine and piperazine. The nematocides of the present invention display nematocidal activity, on the basis of nickel content, in amounts as low as about 0.05 part per million (p.p.m.) of soil, e.g., about 0.1 or 1 or 5 p.p.m. Higher nickel concentrations of up to about 20 p.p.m. or higher can be employed; however, in most instances amounts exceeding 20 p.p.m. are unnecessary.

Any means which insure good admixture of the nematocides of the invention with the soil to be treated to a depth sufficient to protect the root structure of the particular crop can be employed. The nematocides of the present invention can advantageously be introduced into the soil to be treated with a soil chisel using the nematocide in the form of a wettable powder prepared by conventional means.

Nematocidal amounts, e.g., up to about 150 pounds per acre, are introduced into nematode-infested soil in the form of a wettable powder or advantageously it is simply applied to soil surface and plowed into the soil when the soil is being prepared for planting. A short period, e.g., about 3 to 4 days, after treatment the soil can be sown without undue retardation of germination which is a distinct advantage over nematocides such as halogenated hydrocarbons which require a waiting period of about 10 days.

For the purpose of giving those skilled in the art a better appreciation of the advantages of the invention, the following illustrative example is given:

Example I

The nematocidal activity of nickel morpholine dithiocarbamate was confirmed by pot tests employing tomato seedlings as the host index. *Meliodogyna hapla* as the causal organism to be studied was introduced into the soil by preparing one part of heavily infested Root Knot soil mixed with diced fragments of Root Knot galls from tomato root tissue and this was admixed with eight parts of ordinary potting soil. The admixture was cured for two weeks to permit larval hatching of the nematodes and escape of individuals that may have been entrapped in the tomato root tissue. A uniform and homogeneous infested soil was achieved by occasionally mixing the admixture during the curing period.

After the curing period, nickel morpholine dithiocarbamate was introduced into the infested soil employing a preparation containing, by weight, 25% nickel morpholine dithiocarbamate, 25% pre-mix powder and 50% Continental clay. The pre-mix powder contained, by weight, 92% synthetic silica pigment, 4% anionic surfactant (sodium ligno sulfate) and 4% non-ionic surfactant (polyoxyethylene condensate with polyoxypropylglycol). Three portions, each weighing one kilogram, were treated with the aforementioned preparation in amounts corresponding to 150, 75 and 37.5 pounds per acre, respectively. A tumbling action during introduction insured a homogenous distribution of nickel morpholine dithiocarbamate throughout the infested soil. The treated soil was stored for 48 hours in a closed container. At the end of the 48 hour period, the treated soil was transferred to pots 6 inches in diameter and ten tomato seedlings were transferred to each pot. In like manner, infested but untreated soil was planted with ten tomato seedlings as a control.

After the growing season, the number of plants surviving (PS) were observed and recorded. The plants were unpotted and the root structures were washed to remove any clinging debris. Root structure damage in the form of gall formations were observed and recorded on a zero to five rating system, called the Root Knot Index, RKI, in which zero indicates no damage and five represents extensive gall formation caused by the *Meliodogyna hapla* organism. The table confirms the effectiveness of nickel morpholine dithiocarbamate as a nematocide.

TABLE

| Test No. | Dosage, pounds/acre | No. of pots | Average PS per pot | RKI |
|---|---|---|---|---|
| 1 | 150 | 10 | 6.7 | 2.67 |
| 2 | 75 | 10 | 7.0 | 3.00 |
| 3 | 37.5 | 10 | 8.0 | 3.00 |
| 4 | 0 | 10 | 6.1 | 5.00 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A process for the control of nematodes which comprises contacting nematodes infesting soil with nematocidal amounts of nickel morpholine dithiocarbamate.
2. A process as described in claim 1 wherein nickel morpholine dithiocarbamate in such amounts that the nickel content in the soil is within the range of about 0.5 to about 20 parts per million parts of soil is employed.

References Cited

UNITED STATES PATENTS

| | | | |
|---|---|---|---|
| 2,492,314 | 12/1949 | Olin et al. | 260—429 |
| 2,538,047 | 1/1951 | Sanders et al. | 260—45.75 |
| 2,567,358 | 9/1951 | Waletsky | 167—761 |
| 2,609,405 | 9/1952 | Torrence | 260—761 |
| 2,658,091 | 11/1953 | Torrence | 260—761 |
| 2,971,880 | 2/1961 | Keil et al. | 167—14 |
| 3,085,043 | 4/1963 | Beaver et al. | 167—22 |
| 3,214,332 | 10/1965 | Hochwalt | 167—14 |
| 3,281,315 | 10/1966 | Suzegar | 167—22 |
| 3,285,921 | 11/1966 | Ortner et al. | 260—270 |

OTHER REFERENCES

Verbanc: I & EC 44: 1023–1027, May 1952, "Nickel Compounds in Elastomers."

ELBERT L. ROBERTS, *Primary Examiner.*

S. K. ROSE, *Assistant Examiner.*